(12) United States Patent
Glazer

(10) Patent No.: US 7,886,700 B2
(45) Date of Patent: Feb. 15, 2011

(54) RETRACTABLE LEASH ASSEMBLY

(76) Inventor: Shelly K. Glazer, 45 Leach La., Natick, MA (US) 01760

( * ) Notice: Subject to any disclaimer, the term of this patent is extended or adjusted under 35 U.S.C. 154(b) by 959 days.

(21) Appl. No.: 11/638,715

(22) Filed: Dec. 14, 2006

(65) Prior Publication Data
US 2008/0141950 A1 Jun. 19, 2008

(51) Int. Cl.
B65H 75/34 (2006.01)
(52) U.S. Cl. ...................................... 119/796
(58) Field of Classification Search ................. 119/795, 119/796, 769, 772, 794, 797, 798
See application file for complete search history.

(56) References Cited

U.S. PATENT DOCUMENTS

| | | | |
|---|---|---|---|
| 2,222,409 A | 11/1940 | Gottlieb | |
| 2,919,676 A | 1/1960 | Schneider | |
| 3,233,591 A | 2/1966 | Rogers et al. | |
| 4,501,230 A | 2/1985 | Talo | |
| 4,964,370 A | 10/1990 | Peterson | |
| D392,429 S | 3/1998 | Plewa et al. | |
| 5,887,550 A * | 3/1999 | Levine et al. | 119/796 |
| D439,302 S | 3/2001 | Plewa | |
| 6,273,029 B1 * | 8/2001 | Gish | 119/792 |
| 6,405,683 B1 | 6/2002 | Walter et al. | |
| 6,474,270 B1 * | 11/2002 | Imes | 119/796 |
| 6,648,261 B2 | 11/2003 | Irving | |
| 6,792,893 B1 | 9/2004 | Quintero et al. | |
| 6,935,277 B2 | 8/2005 | Vaccari | |
| D519,246 S | 4/2006 | Plewa | |
| 2005/0263103 A1 * | 12/2005 | Updyke et al. | 119/796 |

* cited by examiner

Primary Examiner—Michael R Mansen
Assistant Examiner—Monica Williams
(74) Attorney, Agent, or Firm—Edward L. Kelley; DBA Invention Management Associates

(57) ABSTRACT

A retractable leash assembly (10, 22, 30, 38) for tethered to the animal includes a flexible member for forming safety band (20, 26, 34, 39) wrapped around a user wrist and for forming a tethering element (22, 28, 36, 39) for tethered the safety band to a gripping handle (42) of a retractable leash housing (40). The flexible member comprises a round cord, rectangular strap or combination thereof. In addition a cord lock element (66) or adjustable loop (88) may be used to adjust the diameter of the safety band around a user wrist. In addition and adjustable length leash extension allows two animals to be tethered by different length leash extensions.

15 Claims, 9 Drawing Sheets

RETRACTABLE LEASH ASSEMBLY

BACKGROUND OF THE INVENTION

1. Field of the Invention

The present invention relates to a retractable animal leash having a safety band for wrapping around a user wrist and a tethering element for attaching the safety band to a retractable leash housing. The invention further relates to optional leash extension having an adjustable length for tethering two animals with different leash lengths.

2. Description of the Related Art

Conventional animal leashes (non0retractable) used to tether animals for walking generally comprise a leash element having a user attachable snap hook on one end of the leash element, for attaching to an animal collar, and a user handle on the other end of the leash element for grasping by the user. The user handle generally comprises a closed loop for easy grasping. The user may loop the handle around the gripping hand or around the wrist of the gripping hand to improve the grip.

Generally the leash and the leash handle are made from the same material such a circular cord or rope or rectangular strap or webbing woven from fabric or other fine stands. The fabric may comprise natural plant fibers, such as cotton or hemp, animal hide, such as leather, or a synthetic fiber such as nylon or polypropylene. Usually the diameter or width of the leash material is selected to accommodate the comfort of the user grip and not the desired tensile strength needed to tether the animal. Accordingly, closed loop leash handles are sized for easy gripping and to prevent user injuries. A larger diameter or wider width leash material distributes leash pulling force over more surface area of the hand or wrist. This helps to distribute and constricting or abrasive forces over a larger surface area to reduce any likelihood of injuring a user when the leash is suddenly jerked or strongly pulled. Accordingly, circular leash diameters and rectangular leash widths are generally more than 6 mm for small animals, e.g. less than 9 kilograms, and may be up to about 25 mm for larger animals. Generally, the closed looped leash handle improves gripping and when the handle is looped around the hand or wrist. This helps to keep the leash handle in the control of the user at all times.

While conventional (non-retractable) leashes vary in length, the length is usually fixed such that when the animal is close to the user the leash becomes slack and may become tangled with local objects, with the animal or with the user. Moreover, because a conventional leash can be slack during use, when the leash handle is dropped by the user, the animal may not notice that the leash has been dropped because there is not change in leash tension. Accordingly, the user of a conventional leash may be able to reacquire a dropped leash handle without the animal being aware that the leash was dropped.

Retractable leashes provide a variable length leash that extends its length when the animal moves away from the user and further provide a retractor mechanism that retracts any slack in the leash as the animal moves closer to the user. This action prevents the leash from becoming tangling but also applies a substantially constant tension force on the leash. The tension force pulls the animal collar such that the animal is generally aware that the leash is attached to and pulling on the collar.

Most retractable leashes also provide a braking mechanism and a brake actuator that can be actuated by the user. The braking mechanism stops the leash from retracting or extending and thereby fixes the leash length. Thus a retractable leash performs like a conventional leash when the braking mechanism is engaged. Retractable leases in various configurations are available for large, medium and small animals from a number of manufacturers and distributors including, FLEXI USA, Inc. of Cincinnati Ohio and PET EDGE at www.pet-edge.com.

Most conventional retractable leash include a housing, for enclosing the retractor and braking mechanisms, and the housing includes a user handle formed integral with the housing. Because the user grips a retractable leash by the handle instead of by the leash material, retractable leashes can employ smaller diameter rope or cord leashes and or smaller width strap leashes. This is different from a conventional leash which is made from materials that are more suited to the user grip than to a desired tensile force. Accordingly retractable leashes generally weight less than conventional leashes because they are smaller in diameter and or width and may be made from lighter weight leash materials.

Early retractable leashes, such as the ones disclosed in U.S. Pat. Nos. 2,222,409 to Gottlieb, 2,919,676 to Schneider, 3,233,591 to Rogers et al. and 4,964,370 to Peterson, generally include a retractor, a retractor housing, a brake actuator movable with respect to the retractor housing, and a closed loop leash handle, much like the closed looped leash handle of a conventional leash. However, none of these early retractable leashes includes a gripping handle formed integral with the retractor housing. Later model retractable leashes, such as the ones disclosed in U.S. Pat. Nos. 4,501,230 to Talo, 6,648, 261 to Irving, 6,935,277 to Vaccari, 6,405,683 to Walter et al., D392,429 to Plewa et al., D439,302 to Plewa and D519,246 to Plewa all appear to include a retractor, a retractor housing, a brake actuator movable with respect to the retractor housing, and a gripping handle formed integral with the retractor housing. However none of these later model retractable leashes includes a closed loop leash handle suitable for use as a safety device in the event the retractor housing is dropped by the user.

Pet experts' caution, that users of a retractable leash should maintain a firm grip on the retractable leash gripping handle because retractable leash handles can slip or be jerked out of a users hand more easily than a conventional closed looped leash handles that are looped around the users hand or wrist. Moreover, when a user drops a retractable leash housing, in most instances the leash retractor mechanism immediately begins to retract the leash thereby pulling the retractor housing away from the user and toward the tethered animal. This action reduces tension in the leash thereby alerting the tethered animal that the leash handle has been dropped. Moreover, since the retractor housing is being pulled away from the user it is more difficult for the user to retrieve the leash handle quickly. Of even more concern, many animals, and especially small animals, are spooked by the moving retractor housing which appears to the animal to be chasing it from behind. In either case, the tethered animal may run off, or worse, run wildly into the path of a moving vehicle.

Pet experts further caution that retractable leash users should keep a thumb or finger on the brake actuator at all times so that the user can immediately stop an animal in the event that the animal is about to enter harms way. Applicants have noticed that paying close attention to the brake actuator and the movement of the tethered animal also takes the users' focus away from gripping the handle and this can lead to inadvertent handle drops.

BRIEF SUMMARY OF THE INVENTION

The problems of the prior art are overcome by providing an improved retractable leash assembly for tethering an animal and especially smaller dogs that tend to be easily spooked when a retractable leash housing is pulled toward the dog from behind.

In particular, a retractable leash (15) has a housing (40) with a gripping handle (42) formed integral with the housing (40). To attach the housing (40) to the wrist of a user, a flexible member is configured to form a safety band (39) for looping around a user wrist and for tethering the safety band (39) to the gripping handle (42). In a further improvement, a cord lock element (66) is installed over the flexible member and is movable along the flexible member to adjust a diameter of the safety band (34).

The flexible member is formed with a first connecting element (62) attached to a first end a flexible member (39) and with a second connecting element (64) attached to a second end. The first and second connecting elements (62, 64) comprise a mating pair that can be attached together to close the flexible member into a safety band but the connectors can also be detached to open the safety band. In retractable leash assemblies that have pistol style handles (50) an eyelet (52) is installed extending out from the gripping handle (50) and the flexible member is threaded through the eyelet to tether the safety band to the gripping handle. Alternately in retractable leash assemblies that have a closed access loop (48) the flexible member is threaded through the access loop to tether the safety band to the gripping handle (42). Generally the flexible member may comprise comprises a circular cord member having a diameter in the range of 1.5-6.0 mm, a rectangular strap member having width W in the range of 2.5-16 mm and thickness T in the range of 0.25-2.0 mm or a combination of both.

In further embodiments, the flexible member includes a safety loop to wrap around the user wrist and a tethering loop to wrap around the gripping handle (42). In particular, a cylindrical tethering element (28) has a hollow chamber (148) used to receive and capturing first (144) and second (146) ends of a flexible member (142) therein to form the safety band (26). The tethering loop (60) comprising a second flexible member (154) having a first end (156) fixedly attached to the tethering element (28) and a second end (162) detachably attached to the tethering element (28). To attach the tethering loop to the gripping handle, the second end (162) passes through the access loop (48) to capture the gripping handle (42) inside the tethering loop (60).

In a further embodiment, the flexible member includes a strap element safety band (20) and a strap tethering element (22) attached to the safety band by a loop connector (72). In this embodiment the safety band is formed with a first closed end loop (86) at a first end to capture the loop connector (72) and a first slide and release element (76). The safety band has a second closed loop (88) formed at its second end to capture a second slide and release buckle 78 used to mate with the first slide and release buckle (76) for forming the safety band. In this embodiment, the second closed loop (88) includes a slide buckle configured to slide along the loop to change its diameter.

The tethering element (22) is formed with a closed loop (100) formed at a first end for enclosing the loop connector (72) to thereby attach the tethering element to the safety band (20). The tethering element includes a first slide and release connector 106 disposed to slide along the strap element (98) and a second end of the strap element (98) for mating with the first slide and release element to close the tethering loop. The slide and release element is captured by a second closed loop (102) formed at a second end of the strap element (98). The second slide and release connector (104) is threaded through the access loop (48) to loop the tethering loop around the gripping handle (42).

In a further embodiment of the invention, an improved retractable leash assembly (110) includes a retractable leash (15) having a housing (40), a gripping handle (42) formed integral with the housing (40) and a retractable leash (112) having a free end (116) extending through an orifice (114) that passes through the housing (40). A closed ring (118) sized larger than the orifice (114) is attached to the free end (116) to prevent the free end form being retracted into the orifice.

A first leash extension (120) is attached to the closed ring (118) or otherwise attached to the leash free end (116) for tethering a first animal and the first leash extension has a first fixed overall length. A second leash extension (126) is optionally attached to the closed ring (118) or otherwise attached to the leash free end (116) for tethering a second animal. In particular, the second leash extension is configured with a slide buckle (90) for adjusting the overall length of the second leash extension (126). The length of the second leash extension is adjustable to up to about twice the fixed overall length of the first leash extension. This allows the second animal to be tethered with a longer leash.

BRIEF DESCRIPTION OF THE DRAWINGS

The features of the present invention will best be understood from a detailed description of the invention and a preferred embodiment thereof selected for the purposes of illustration and shown in the accompanying drawing in which.

DETAILED DESCRIPTION OF THE INVENTION

Figure 1:
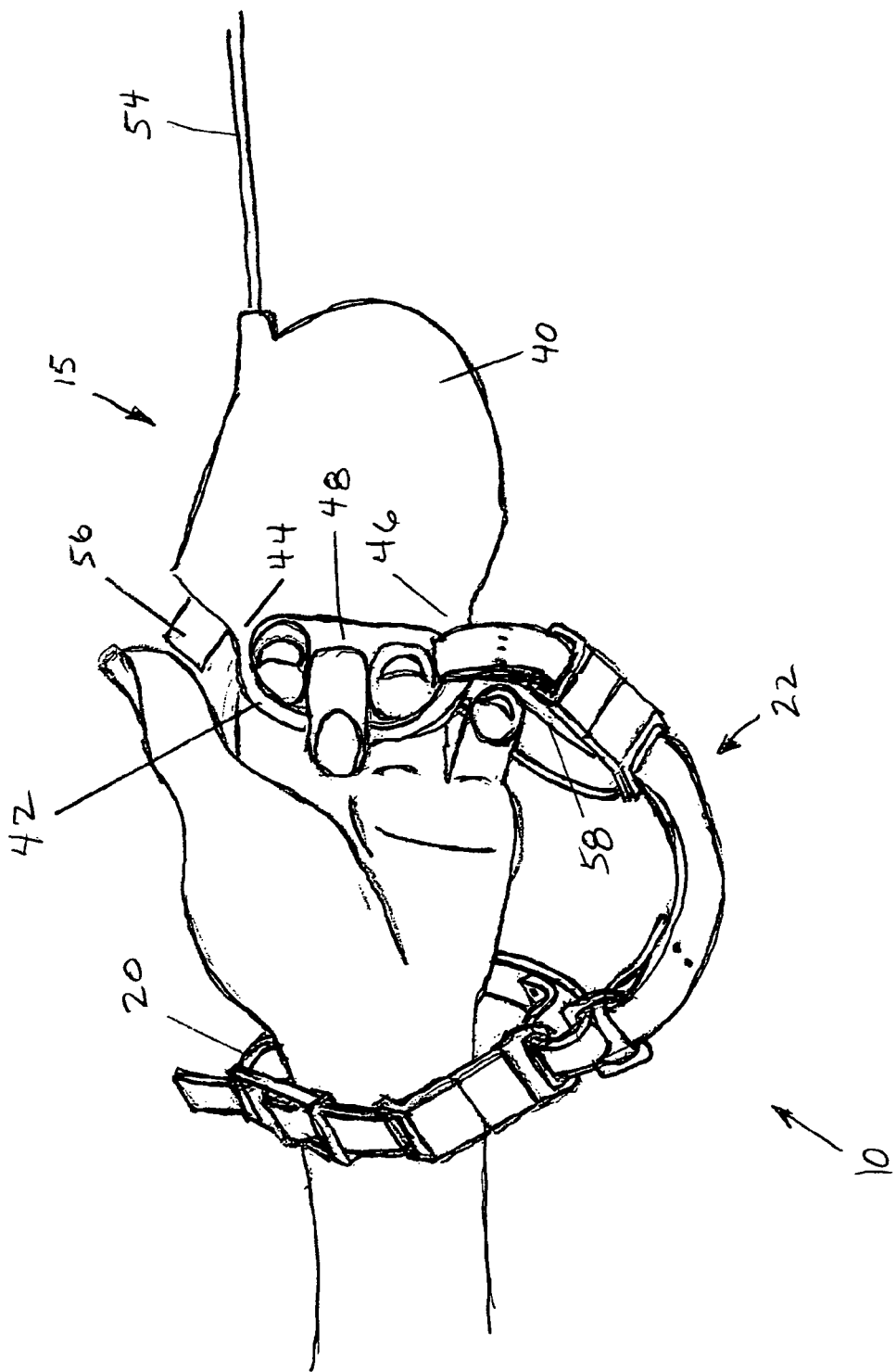
FIG. 1 illustrates a side view of a first retractable leash assembly having a safety band attached to a user wrist and a tethering element attached to a retractable leash housing according to the present invention.

Referring to FIG. 1 a first retractable leash assembly 10, according to the present invention, is shown in side view. The first retractable leash assembly 10 includes a convention retractable leash, generally indicated by reference numeral 15, a safety band 20 comprising a strap element wrapped around the wrist of a user, and a tethering element 22 comprising a strap element extending between the safety band 20 and the retractable leash 15 and attached to a gripping handle 42 of the retractable leash 15.

Figure 2:
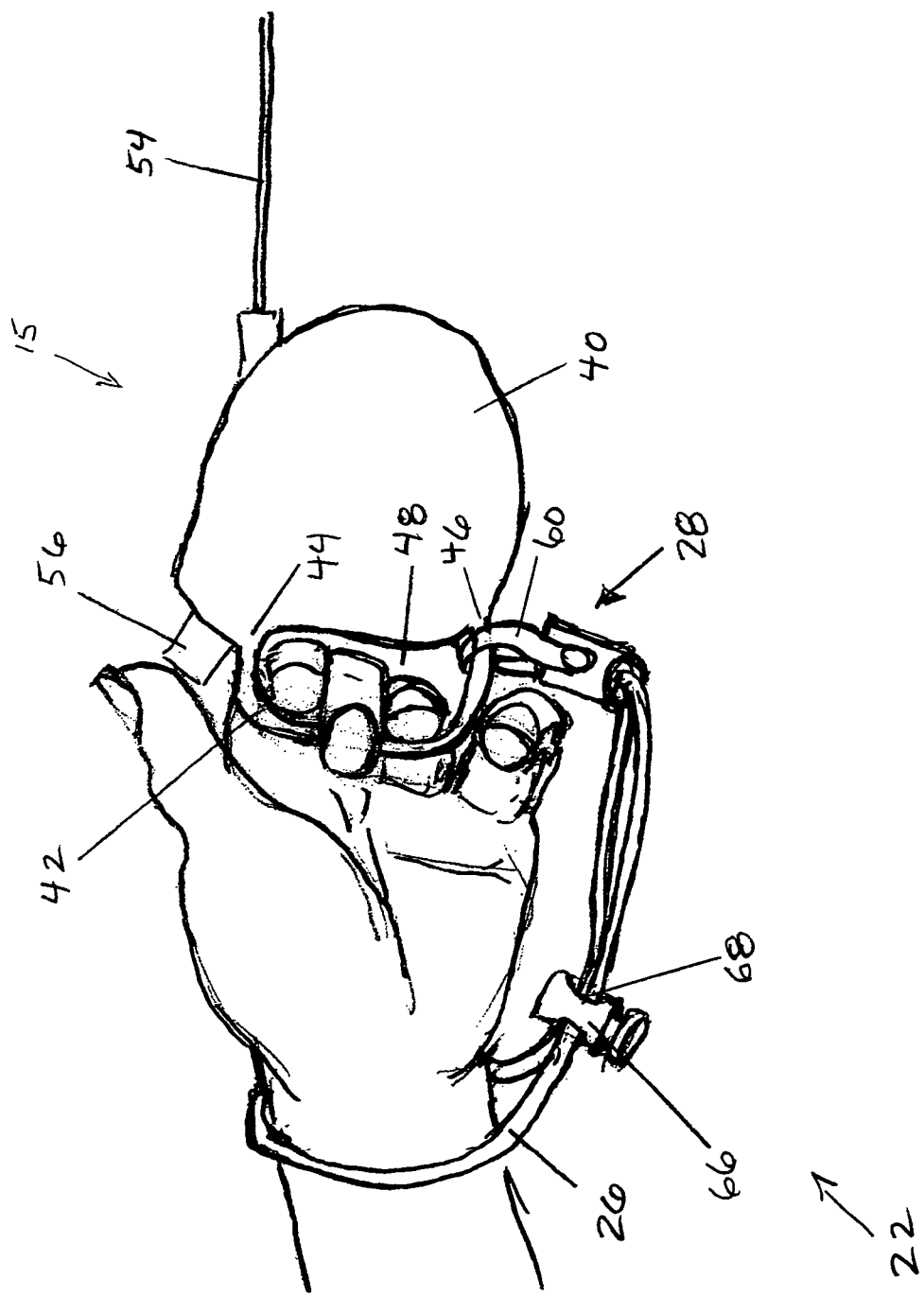
FIG. 2 illustrates a side view of a second retractable leash assembly having a safety band attached to a user wrist and a tethering element attached to a retractable leash housing according to the present invention.

Referring to FIG. 2, a second retractable leash assembly 24 according to the present invention is shown in side view. The second retractable leash assembly 24 includes a conventional retractable leash 15, a safety band 26, comprising a cord element wrapped around the wrist of a user, and a tethering element 28, comprising a cord element, extending between the safety band 26 and the retractable leash 15 and attached to a gripping handle 42 of the retractable leash 15.

Figure 3:
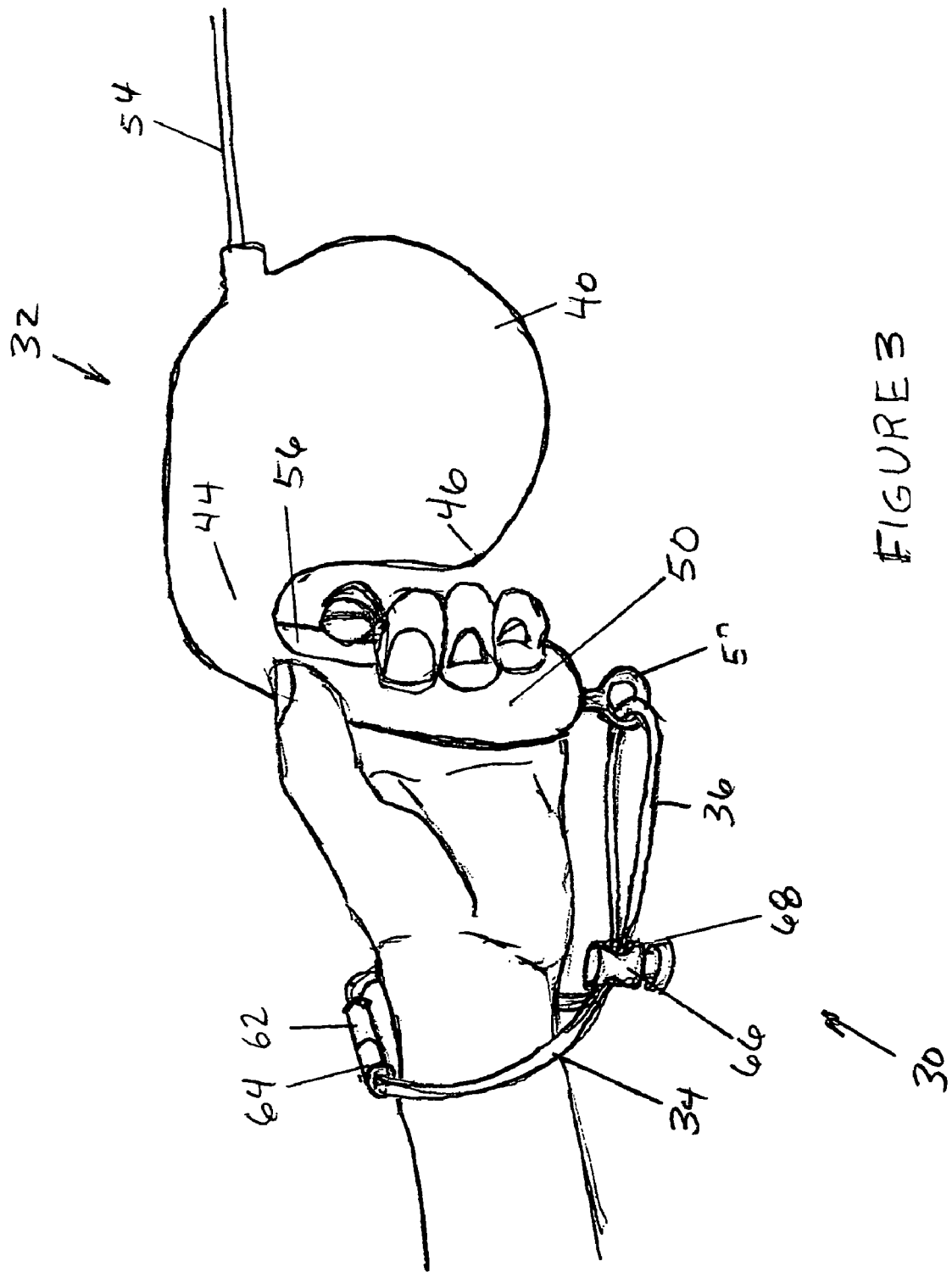
FIG. 3 illustrates a side view of a third retractable leash assembly having a safety band attached to a user wrist and a tethering element attached to a retractable leash housing according to the present invention.

Referring to FIG. 3, a third retractable leash assembly 30 according to the present invention is shown in side view. The third retractable leash assembly 30 includes a conventional retractable leash 32, a safety band 34, comprising a cord element wrapped around the wrist of a user, and a tethering element 36, comprising a cord element extending between the safety band 34 and the retractable leash 32 and attached to an eyelet 52 extending out from the retractable leash gripping handle 50.

Figure 4:
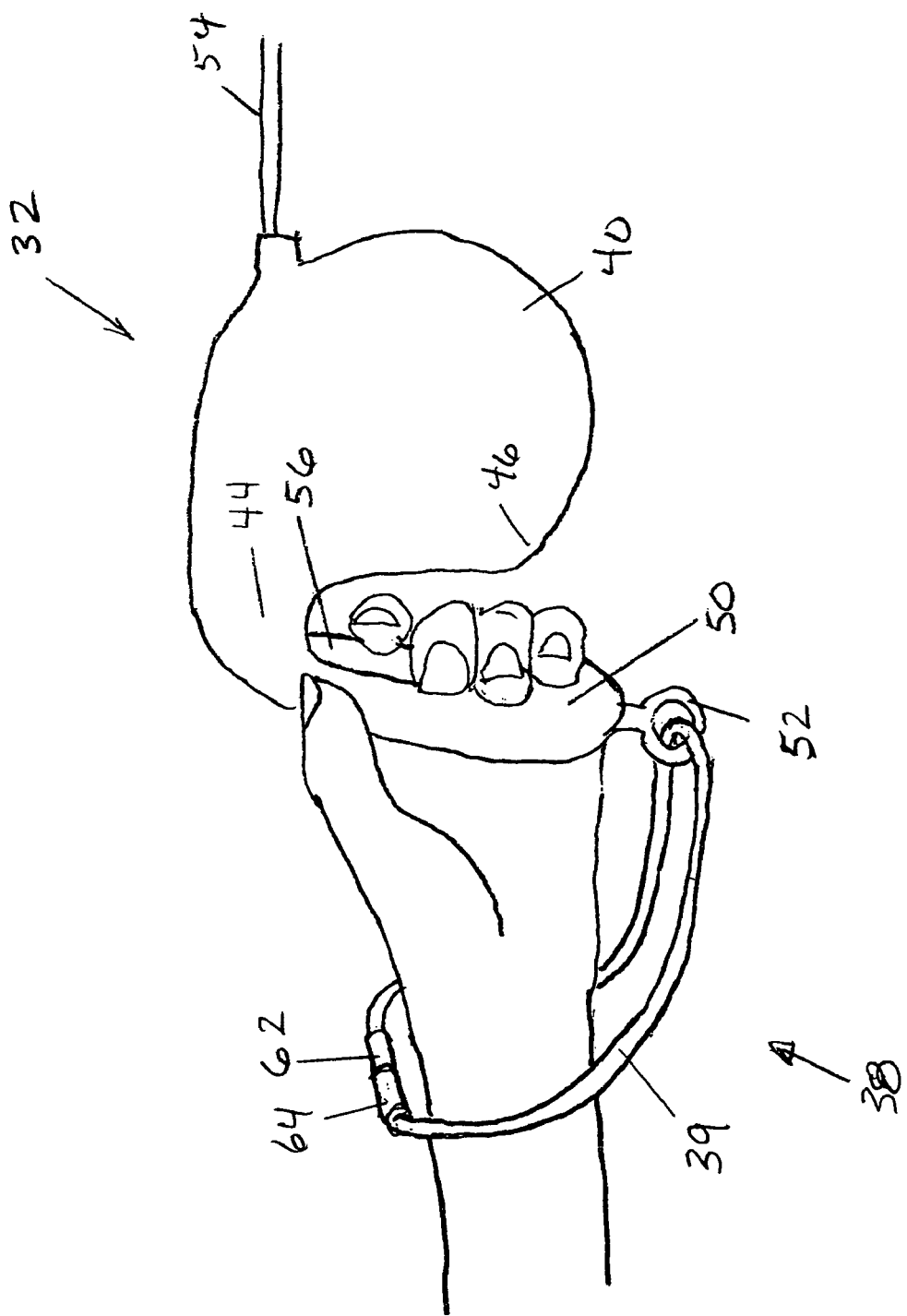
FIG. 4 illustrates a fourth retractable leash assembly having a safety band attached to a user wrist and tethered to a retractable leash housing according to the present invention.

Referring to FIG. 4, a fourth retractable leash assembly 38 according to the present invention is shown in side view. The fourth retractable leash assembly 38 includes a conventional retractable leash 32, a safety band 39, comprising a cord element wrapped around the wrist of a user, and wherein the safety band 39 further comprises a tethering element extending between the safety band 39 and the retractable leash 32 and attached to an eyelet 52 extending out from the retractable leash gripping handle 50.

Referring now to FIGS. 1 and 2, the retractable leash 15 includes a housing 40 formed with an integral gripping handle 42, attached to the housing 40 at a top position 44 and at a bottom position 46, such that the gripping handle 42 encloses an access loop 48. As shown, the access loop 48 passes through the housing 40 and provides access for users fingers to pass between the housing 40 and the gripping handle 42. As is further shown in FIGS. 1 and 2, the tethering elements 22 and 28 each include a tethering loop 58 and 60 respectively. As will be detailed below, the tethered loops 58 and 60 are configured with a detachable connectors at end of the loop which are used to open the tethering loops 58 and 60 to thread an end of the tethering loops 58 and 60 through the access loop 42 and around the gripping handle 42.

Referring now to FIGS. 3 and 4 the retractable leash 32 includes a housing 40 formed with a pistol style handle 50. The pistol style handle 50 is formed integral with the housing 40 at the top position 44 but is separated from the housing 40 at the bottom position 46. Accordingly, the pistol style handle 50 provides access for user fingers to pass between the housing 40 and the pistol handle 50, but the pistol handle 50 does not form a closed loop like the access loop 48. The pistol style handle 50 includes an eyelet 52 or other looped attaching element extending out from the pistol handle 50. The eyelet 52 is sized to receive an end of the cord element including any connector attached to the end of the cord element there through for attaching the cord element to the leash housing 40.

In each of FIGS. 3 and 4, the safety bands 34 and 39 include detachable connecting elements 62 and 64. The connecting elements 62 and 64 are permanently attached to each end of a cord element and the detachable connecting elements 62 and 64 are configured to attach to each other to form a closed loop. Thus in the example of FIG. 4, a user may detach the connecting elements 62 and 64 to open the loop, feed one of the connecting element 62 or 64 through the eyelet 52 and then reattach the connecting elements 62 and 64 to close the loop.

Referring to FIGS. 2 and 3, a cord lock element 66 is also included to adjust the size of the safety loops 26 and 34 to fit the safety bands more snugly over the wrist. The cord lock element 66 includes a pass through aperture 68 for receiving one or both ends of the core element, including one or both of the detachable connecting elements 62 and 64 there through. Referring to FIG. 2, the cord lock element 66 can be installed by passing the safety loop 26 through the pass through aperture 68. Referring to FIG. 3, the cord lock element 66 is installed by first threading one end of the cord, including one of the connecting elements 62 or 64 through the eyelet 52 and then threading both of the connecting elements 62 and 64 through the pass through aperture 68. The cord lock element 66 includes movable internal elements biased by an internal compression spring to lock against a cord element passing through the pass through aperture 68 and to hold the cord lock element at a desired position. One example of a commercially available cord lock elements sold by FASNAP is shown at www.fasnap.com under the heading cord lock.

Referring now to FIGS. 1-4, each retractable leash 15, 32 includes a leash 54 that extends out of the housing 40 through a leash orifice, not shown. The leash 54 may comprise a cord element having a circular cross section or a strap element having a rectangular cross-section. The leash 54 attaches to a retracting mechanism, not shown, housed inside the housing 40 and the retracting mechanism applies a continuous retracting force that acts to continuously take-up or retract the leash 54 into the housing 40. A brake element, not shown, is provided inside the housing 40 for arresting movement of the leash 54. In operation, a tethered animal attached to the leash 54 and pulling on the leash 54 overcomes the retracting force to lengthen the leash 54. The leash can be paid out until its full length is extended out from the housing 40, or the user can use the brake element to stop movement of the leash 54 to arrest movement of the tethered animal or to set a fixed leash length as desired. The brake element includes a brake actuator 56 that extends through the housing 40 and is movable with respect to the housing to actuate the break element in response to user actuation by a finger or thumb. As shown in FIGS. 1 and 2, the brake actuator 56 is positioned for actuation by a users thumb. As showing in FIGS. 3 and 4, the brake actuator 56 comprises a trigger style actuator positioned for actuation by a user tightening the grip around the pistol style handle 50.

Examples of retractable leashes like those described above are disclosed in U.S. Pat. Nos. 6,405,683 by Walter et al., 4,501,230 by Talo, 6,935,277 by Vaccari and 6,648,261 by Irving, each of which is incorporated herein by reference.

Referring now to FIGS. 1, 5A, 5B, 6A and 6B the preferred embodiment of the retractable leash assembly 10 includes a strap element 70 that includes two separate strap elements, the safety loop 20 and the tethering element 22, attached together by a loop connector 72. Each of the safety loop 20 and tethering element 22 is formed from strap materials of substantially rectangular cross section having a width dimension W, shown in FIG. 6B, and a thickness dimension T, shown in FIG. 6A. Preferably, the strap materials are braided from flexible synthetic fibers such as nylon or polypropylene which have good tensile strength, wear and weather resistance and are non-irritating or abrasive when worn around the wrist. However, any other suitable synthetic or natural fiber material may be used. Alternately, natural or synthetic non-woven or braided materials such as leather or vinyl may also be used to form the straps. Moreover, the safety loop 20 and tethering element 22 may each comprise a different strap size or material. Generally, the strap element 70 may be formed using any strap materials having a width W in the range of 2.5-16 mm, (approximately 0.1-0.6 inches) and a strap thickness T in the range of 0.25-2.0 mm, (approximately 0.01-0.08 inches).

The safety loop 20 includes a strap element 74 having a first (male or female) slide and release buckle 76 attached to a first end thereof and a second (male or female) slide and release buckle 78 attached to a second end thereof. The slide and release buckles 76 and 78 are conventional strap buckles, shown in detail in the top view of FIG. 6B, with each slide and release buckle having a strap receiving aperture 80 and interlocking male or female elements 82 and 84. Such buckles are commercially available from DYI ER KANG ENTERPRISES CO. LTD. under the product name DEK-156B SLIDE AND RELEASE BUCKLE, shown at www.buckle-.hardwarenet.com.tw The first slide and release buckle 76 is attached to the strap element 70 by a closed end loop 86 that passes a first free end of the strap element 70 through the strap receiving aperture 80. The first free end is overlapped onto the strap 70 and sewn thereto to permanently close the loop 86 thereby capturing the first buckle 76 in the loop 86. A loop connector 72 comprises a closed looped attaching element, such as a rigid D-ring or O-ring element which is generally available commercially. The loop connector 72 is also captured by the closed end loop 86 by passing the strap element first free end through the loop connector 72 before sewing the loop closed.

The second slide release buckle 78 is attached to the strap element 74 by forming an adjustable end loop 88 that passes a second free end of the strap element 74 through the strap receiving aperture 80 and forming the adjustable loop 88 in cooperation with a slide buckle 90, which is also generally available commercially. The slide buck 90 includes two strap receiving apertures 92 and 94 for receiving the second free end of the strap element 74 there through. In a first adjustable loop configuration, shown in FIGS. 5A and 6A, the free second end of the strap element 74 is terminated in a closed loop 96 that wraps around and captures a center post 91 of the slide buckle 90. In the first configuration of the adjustable loop 88 shown in FIGS. 5A and 6A, the diameter of the safety loop 20 is adjustable by sliding the slide buckle 90 along the strap 74 to increase or decrease the diameter of the adjustable end loop 88.

Figure 5:
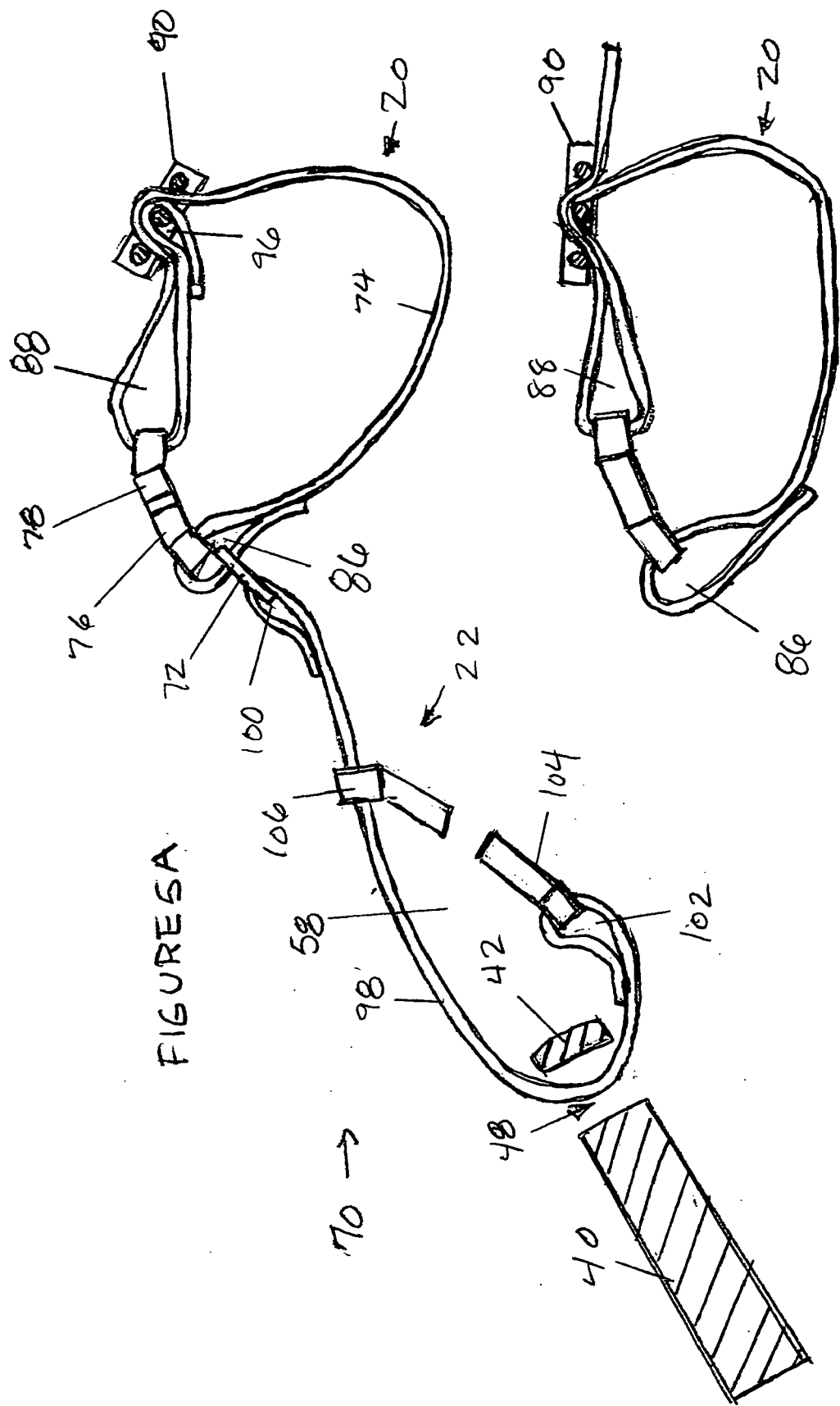
FIG. 5A illustrates a top view of the first retractable leash assembly.
FIG. 5B illustrates a top view of an alternate embodiment of the safety band shown in FIG. 5A.

In a second adjusting loop configuration shown in FIG. 5B, the second free end of the strap element 74 extends through the slide buckle 90 and the diameter of the safety loop 20 is increased by sliding the slide buckle 90 along the strap element 74 until the second free end extends for the slide buck by a minimum length. The diameter of the safety loop 20 is decreased by pulling the second free end of the strap element 74 through the slide buckle 90 to thereby reduce the diameter of the adjustable loop 88.

The tethering element 22 includes a strap element 98 having a first closed end loop 100 that passes a first free end of the strap element 98 through the loop connector 72 before the loop 100 is sewn closed to permanently attach the tethering element 22 to the loop connector 72 at the first free end of the strap element 98. The tethering element 22 includes a second closed end loop 102 that passes a second free end of the strap element 98 through the strap receiving aperture 80 of a first (male or female) slide and release buckle 104 before the loop 102 is sewn closed to permanently attach the first slide and release buckle 104 to the second free end of the strap element 98.

Prior to forming the second end closed loop 102, the second free end of the strap element 98 is threaded through the strap receiving aperture 80 of a second (female or male), slide and release buckle 106, which is disposed to slide along the strap element 98, and which is oriented to connect with the first slide and release buckle 104 to form the closed tethering loop 58. The closed tethering loop 58 is formed by passing the first slide and release element 104 and the second free end of the strap element 98 through the access loop 48 that passes between the retractable leash housing 40 and the gripping handle 42. Thereafter first and second slide and release element 102 and 104 are interconnected to form the closed tethering loop 58. The size of the tethering loop 58 is adjustable by sliding the second slide and release buckle 106 along the strap element 98 to open or close the diameter of the tethering loop 58.

In a first alternate embodiment of the tethering element 22, the second slide and release buckle 106 may be captured by the first closed loop 100 such that the first loop 100 captures the slide and release buckle 76, the loop connector 72 and the second slide and release buckle 106.

In a second alternate embodiment of the tethering element 22, the first and second slide and release buckles 104 and 106 are eliminated by forming the second closed loop 102 around the retractable leash gripping handle 42. In this embodiment the second free end of the strap element 98 is passed through the access loop 48 that passes between the retractable leash housing 40 and the gripping handle 42 the second free end is sewn to the strap element 98 to permanently attach the strap element 98 to the retractable leash handle 42. Accordingly, in each of the above described embodiments of the tethering element 22, the tethering loop 58 attaches the tethering element 22 to the gripping handle 42.

Figure 7:
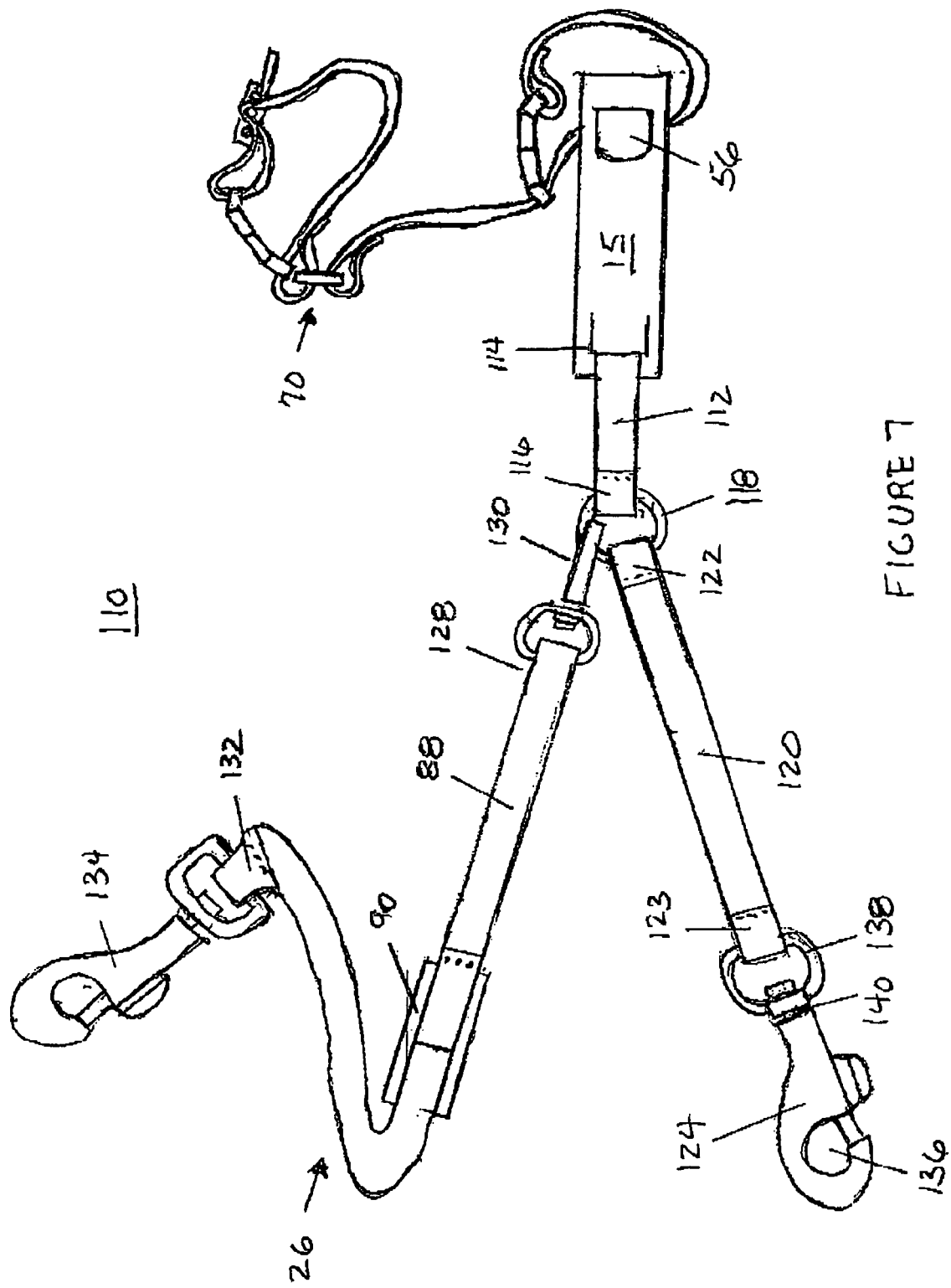
FIG. 7 illustrates a retractable leash assembly having a fixed length and an adjustable length leash attachment attached each attached to the free end of a retractable leash.

Referring to FIG. 7, a retractable leash assembly 110 is shown in top view and includes a retractable leash 15 as described above. The retractable leash 15 includes a strap element leash 112 extending out from a leash orifice 114 with an exposed end 116. The retractable leash 15 also includes a brake actuator 56. Alternately, the leash element 112 may comprise a cord leash element. The retractable leash assembly 110 may also include the strap element 70, like the one shown in FIG. 5A, tethered to the retractable leash gripping handle and to the wrist of a user for keeping the retractable leash attached to the user wrist in the even that the user drops or otherwise looses control of the retractable leash 15.

The strap element leash 112 includes a rigid closed ring 118, such as a metal ring, or other similar terminating element, attached to the exposed end 116. The closed ring 118 may be permanently attached to the leash 112 by passing the exposed end 116 through the closed ring 118 and sewing the exposed end to the leash element 116 in a closed loop to capture the ring 118 therein. The closed ring 118 is sized larger than the leash orifice 114 to prevent the exposed end 116 from being retracted back into the retractable leash 15 through the orifice 114. The closed ring 118 also provides an attaching element to which a first leash extension 120 is attached to the leash 112. The first leash extension extends between the closed ring 118 and a collar or the like of a tethered animal, not shown.

The first leash extension 120 includes a first end 122 attached to the ring 118 by a closed sewn loop or by other suitable attaching means. The first leash extension 120 has a fixed length which may be in the range of range of 15-60 cm, (approximately 6 to 24 inches). The first leash extension 120 includes a first attaching element 124 attached to a second end 123, e.g. by a closed sewn loop or the like, and the first attaching element 124 is configured to attach to an animal collar or the like.

Figure 6:
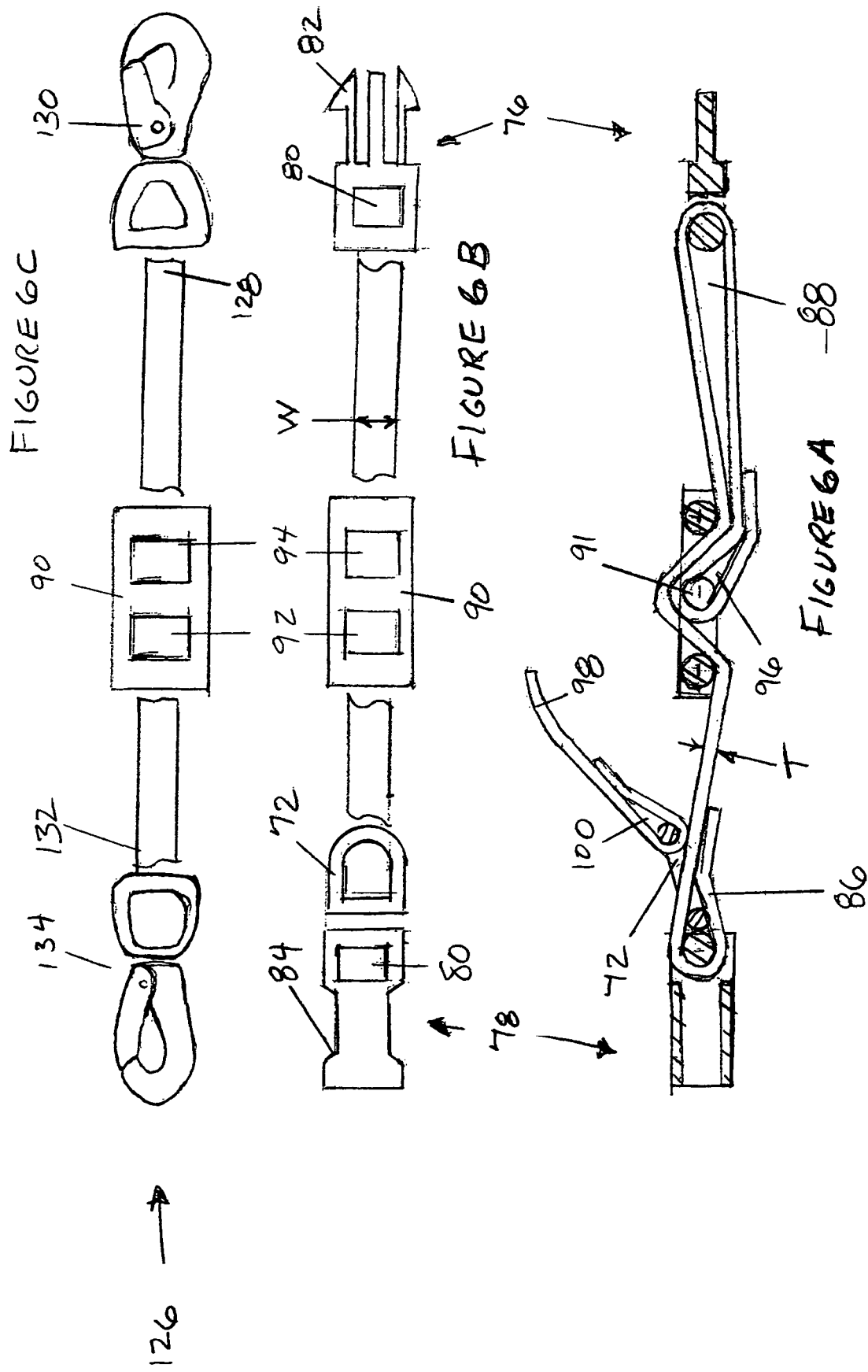
FIG. 6A illustrates a side view of an adjustable length loop according to one aspect of the present invention.
FIG. 6B illustrates a top view of the adjustable length loop shown in FIG. 6A.
FIG. 6C illustrates a top view of an adjustable length leash attachment according to a further aspect of the present invention.

Referring now to FIGS. 6A, 6C and 7, the retractable leash assembly 110 further includes second leash extension 126 for extending between the closed ring 118 and a collar, or the like, of a second tethered animal, not shown. The second leash extension 126 is optionally attached to and detached from the closed ring 118 only when needed. Moreover, a plurality of second leash extensions 126 can attach to the closed ring 118 to tether as many animals as may be required on a single retractable leash 15.

The second leash extension 126 includes a first end 128 having a second attaching element 130 attached thereto, by an adjustable loop, e.g. adjustable loop 88 shown in FIG. 6A. The second attaching element 126 is usable to attach the first end 128 to the closed ring 118 and the adjustable loop 88 is usable to adjust the overall length of the second leash extension 126. In particular, the length of the second adjustable leash 126 is adjustable as may be required to tether a second animal further away from the closed ring 118. This may be advantageous when one animal tends to lead another or when one animal is taller or larger than another and needs more separation from the ring 118. Moreover when a plurality of second leash extensions 126 are used to tether several animals, each second leash extension 126 can be adjusted to a different overall length. In addition, applicants have noticed that the use of a different overall leash extension length for each different animal being tethered reduces tangling of the leashes and generally provides each animal with more freedom to move independently.

The second leash extension 126 includes a second end 132 having a third attaching element 134 attached thereto, e.g. by a closed sewn loop or the like. The third attaching element 134 is usable to attach the leash second end 132 to an animal collar or the like. The second leash extension 126 includes a slide buckle 90 disposed to form the adjustable loop 88 and the slide buckle is configured as described above and as shown in either of FIG. 6A or 5B. In a preferred embodiment, the shortest length of the second leash extension 126 is equal to the length of the first leash extension 120. This occurs when the slide buckle 90 is positioned adjacent to the third attaching element 134 and the adjustable loop 88 extends substantially over the full length of the second leash extension 126. Conversely, the longest length of the second leash extension 126 is approximately twice the length of the first leash extension 120 and this occurs when the slide buckle 90 is positioned adjacent to the second attaching element 130 and the adjustable loop 88 has its shortest length.

According to a preferred embodiment of the leash assembly 110, each of the first, second and third attaching elements 124, 130 and 134 comprises a snap hook 136 for easily attaching to and or detaching from the closed ring 118 or an animal collar as may be the case. In particular, the snap hook 136 is biased to a closed position and can be opened by a user to snap the hook over a desired closed ring or animal collar. In addition, each attaching element 124, 130 and 134 includes a closed attaching ring 138 for attaching to an end of a corresponding leash extension 120 or 126. In addition, a swivel joint 140 is disposed between the snap hook 136 and closed attaching ring 138 to allow free rotation of the snap hook 136 with respect to the closed attaching ring 138 and leash extensions 120, 126 to reduce twisting of the leash extensions.

Figure 8:
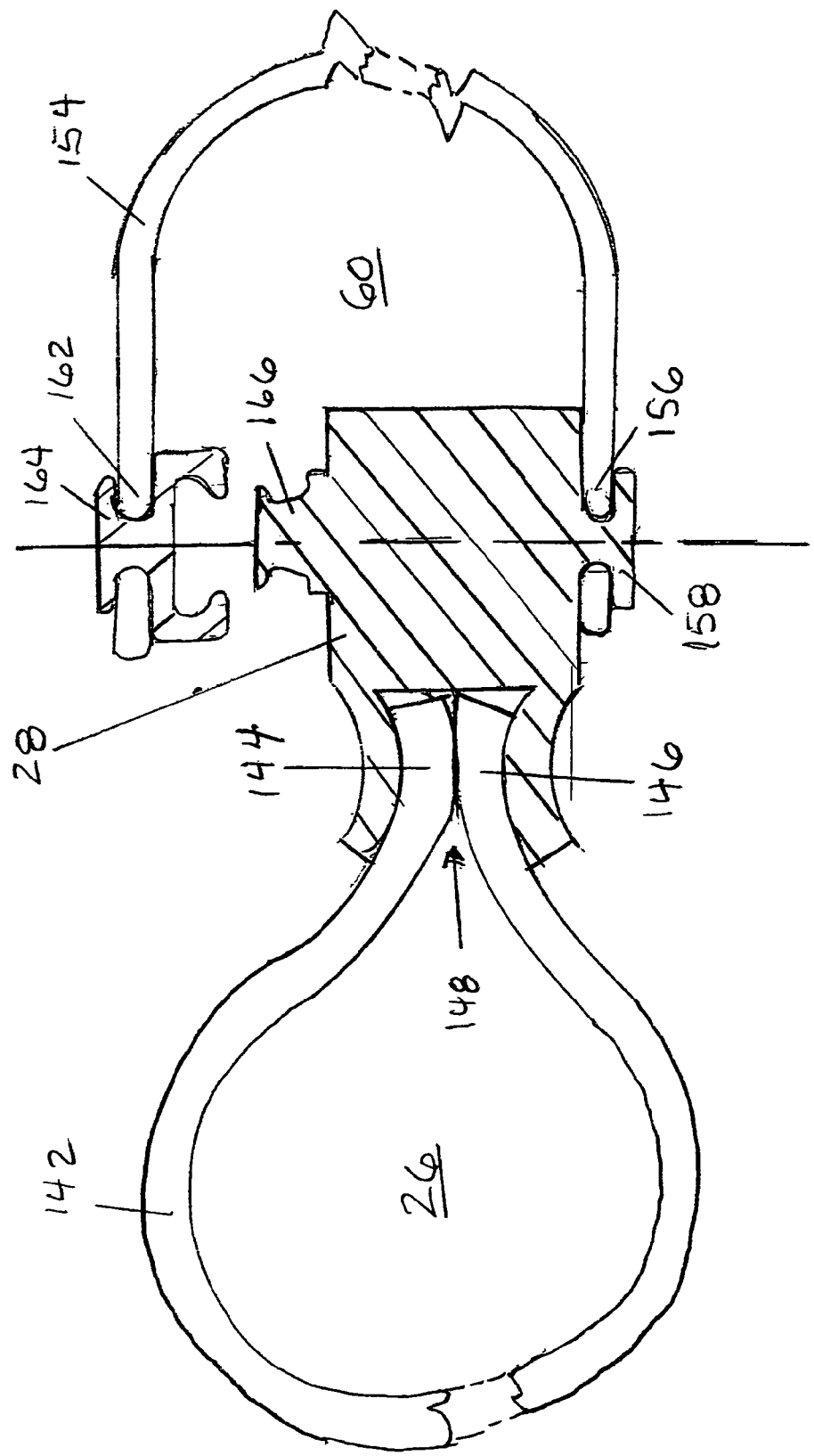
FIG. 8 illustrates a section view taken through the safety band and tethering element shown in FIG. 2.
Figure 9:
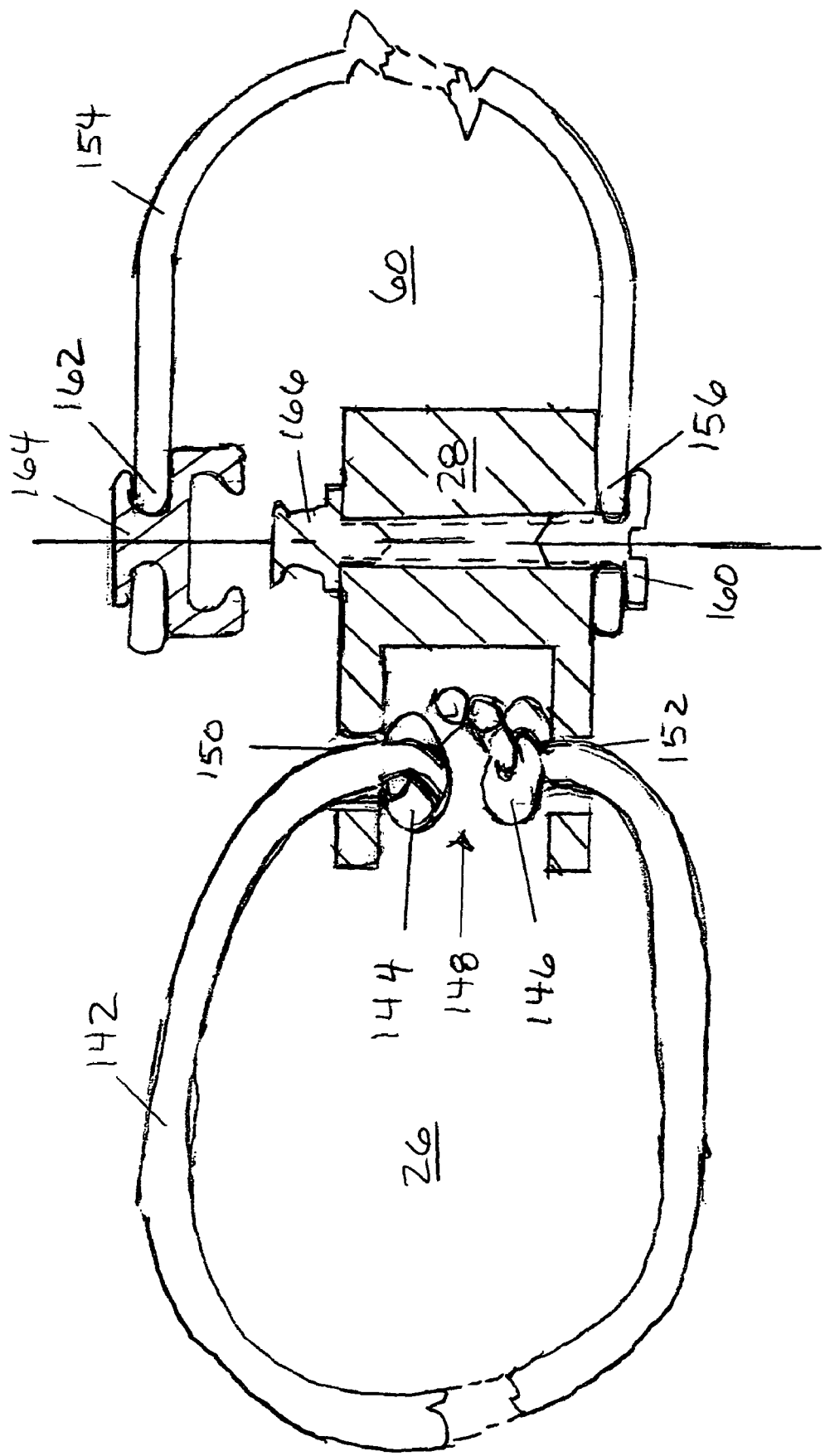
FIG. 9 illustrates a section view taken through an alternate embodiment of the safety band and tethering element shown in FIG. 2.

Referring now to FIGS. 2 and 8-9, FIGS. 8 and 9 depict a section view taken through a cord style safety band 26, tethering element 28 and tethering loop 60. The safety band 26 comprises a circular cord 142 having opposing ends 144 and 146 terminated by the tethering element 28, which is substantially circular in cross-section. The circular cord material may be formed from braided flexible synthetic fibers such as nylon or polypropylene, which have good tensile strength, wear and weather resistance and are non-irritating or abrasive when worn around the wrist. However, any other suitable synthetic or natural fiber material may be used. Alternately, natural or synthetic non-woven or braided materials such as leather or vinyl may also be used to form the cord 142. In addition cord diameters in the range of 1.5-6 mm, (approximately 0.06-0.2 inches), are suitable.

The tethering element 28 includes a circular chamber 148 to receive the ends 146 148 therein and the ends 144, 146 may be crimped therein using a crimping tool. Alternately, as shown in FIG. 9, holes 150 and 152 passing through the chamber wall may receive the ends 146 and 148 there through and the ends 144 and 146 may be knotted or otherwise terminated to keep them inside the chamber 148.

The tethering loop 60 comprises a rectangular strap 154 having a width dimension W and a thickness dimension T and having a first end 156 fixedly attached to the tethering element 28 by suitable means. For example, as shown in FIG. 8, the first end 152 may include a button hole formed there through and the tethering element 28 may be formed with a button style fastener 158 attached thereto to receive the first end 156 thereon. Alternately, as shown in FIG. 8, first end 156 may be attached to the tethering element 28 by a threaded fastener 160.

The strap 154 has a second end 162 configured to alternately attach to and detach from the tethering element 28 to alternately open and close the tethering loop 60. Accordingly, the second end 162 may include a first attaching element 164 attached thereto for mating with a second attaching element 166 fixedly attached to the tethering element 28. In particular, the first and second attaching elements 164 and 166 may comprise mating snap fasteners or the like.

Generally, the above described safety loops and tethering elements extend between a user wrist and the handle of a retractable leash housing. This provides a safety precaution in the event that the retractable leash is dropped or pulled from the users grasp. As noted above, when dropped the retractable leash housing is pulled toward the tethered animal and away from the user. It is known that the action of the retractable leash can spook a tether animal to run away from the oncoming leash. It is also know that a release in leash tension can alert a tethered animal that it is free of tethering and cause the animal to run from the user. These problems are avoided when the retractable leash housing is tether to a user wrist as described herein in the preferred embodiments of the present invention. According to the present invention, the retractable leash is tethered to the user such that the leash remains attached to the user when the retractable leash housing is dropped. This prevents the leash housing from being pulled toward the tethered animal by the retracting force. This allows the user to quickly recover control of the retractable leash housing without the tether animal even becoming aware that the retractable leash housing has been dropped or pulled from the users grasp.

In any of the above described embodiments, the hardware described above including the buckles, fasteners, loop terminators, eyelets, cord lock elements, snap connectors are all generally available commercial products formed from rigid structural materials such as metals or moldable plastics. Generally all metals are treated for weather resistance. In addition, all of the materials are formed with smooth abrasion resistant finishes. Generally, since the safety bands described above are provided to attach the retractable leash 15 to the user and not to tether the animal, the safety bands are not intended to or required to provide a tensile strength of greater than about 5 pounds since they are merely attaching the retractable leash to the user. This allows the use of light weight and low cost cords, straps and hardware elements.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g. for tethering a retractable leash to a user and for tethering a plurality of animals with different leash lengths, those skilled in the art will recognize that its usefulness is not limited thereto and that the present invention can be beneficially utilized in any number of environments and implementations including but not limited to other animal leashes, or combinations thereof. Accordingly, the claims set forth below should be construed in view of the full breadth and spirit of the invention as disclosed herein.

The invention claimed is:

1. A leash assembly for tethering an animal comprising:
    a retractable leash assembly having a housing and a gripping handle (42) formed integral with the housing (40):
    a flexible member configured to form a safety band for looping around a user wrist and a tethering band for tethering the safety band to the gripping handle wherein the safety band is formed by;
    a strap element (74) formed with a first closed end loop (86) at a first end thereof;
    a first slide and release buckle (76) and a loop connector (72) each captured by the first closed end loop (86);
    a second closed loop (88) formed by the strap element (74) at a second end thereof; and,
    a second slide and release buckle (78) captured by the second closed loop (88) and configured to mate with the first slide and release buckle (76) for forming the safety band.

2. The retractable leash assembly of claim 1 further comprising:
    an eyelet (52) extending out from the gripping handle (50); and,
    wherein the tethering band attaches to the retractable leash through the eyelet.

3. The retractable leash assembly of claim 2 wherein the tethering band comprises a circular cord member having a diameter in the range of 1.5-6.0 mm.

4. The retractable leash assembly of claim 1 wherein the flexible member further comprises:
    a tethering element (28) disposed between the tethering band and the safety band (26); and,
    a tethering loop (60) comprising a second flexible member (154) having a first end (156) fixedly attached to the tethering element (28) and a second end (162) detachably attached to the tethering element (28).

5. The retractable leash of claim 4
    wherein the second flexible member (154) comprises a rectangular strap member having width W in the range of 2.5-16 mm and thickness T in the range of 0.25-2.0 mm.

6. The retractable leash assembly of claim 1 further comprising a slide buckle (90) disposed in the second closed loop (88) and movable along the strap element (74) to adjust the size of the second dosed loop (88) and thereby adjust a diameter of the safety hand (20).

7. The retractable leash assembly of claim 6 wherein the gripping handle attaches to the housing (40) thereby forming an enclosed access loop (48) and the tethering band comprises:
    a strap element (98) having a closed loop (100) formed at a first end thereof for enclosing the loop connector (72);
    a first slide and release buckle (106) disposed to slide along the strap element (98);
    a second closed loop (102) formed at a second end of the strap element (98) for enclosing a second slide and release buckle (104) therein; and,
    wherein the second slide and release buckle (104) is configured to detachably connect with the first slide and release buckle (106) and to thread through the access loop (48).

8. A retractable leash assembly according to claim 7 wherein the strap element (98) comprises a rectangular strap member having width W in the range of 2.5-16 mm and thickness T in the range of 0.25-2.0 mm.

9. A retractable leash assembly according to claim 1 wherein the strap element (74) comprises a rectangular strap member having width W in the range of 2.5-16 mm and thickness T in the range of 0.25-2.0 mm.

10. A retractable leash assembly (110) comprising:
    a retractable leash (15) having a housing (40), a gripping handle formed integral with the housing (40) and a retractable leash (112) having a free end (116) extending through an orifice (114) that passes through the housing (40);
    a closed ring (118) sized larger than the orifice (114) and attached to the free end (116);
    a first leash extension (120) having a first end (122) attached to the closed ring (118), a second end (123) having a first attaching element (124) attached thereto, and a first fixed overall length;
    a second leash extension (126) having a first end (128) attached to the closed ring (118) by a second attaching element (130) and a second end (132) configured with a third attaching element (134) attached thereto and an adjustable loop (88) extending between the first end (128) and a slide buckle (90) disposed along the second leash extension and configured to slid with respect thereto for adjusting the overall length of the second leash extension (126);
    a flexible member (70) comprising a safety band (20) for looping around a user wrist and a tethering element (22) for tethering the safety band (20) to the gripping handle;
    wherein the safety band comprises a strap clement (74) formed with a first closed end loop (86) at a first end thereof;
    a first slide and release buckle (76) and a loop connector (77) each captured by the first closed end loop (86);
    a second closed loop (88) formed by the strap element (74) at a second end thereof; and,
    a second slide and release buckle (78) captured by the second closed loop (88) and configured to mate with the first slide and release buckle (76) for forming the safety band.

11. A retractable leash assembly according to claim 10 further comprising another second leash extension (126) having a first end (128) attached to the closed ring (118) by a second attaching element (130) and a second end (132) configured with a third attaching element (134); and, wherein the another second leash extension (126) is configured with an adjustable loop (88) for adjusting the overall length of the another second leash extension (126).

12. A retractable leash assembly according to claim 10 wherein the overall length of the second leash extension (126) is adjustable from said first fixed overall length to substantially twice as long as said first fixed overall length.

13. A retractable leash assembly according to claim 12 wherein said first fixed overall length is in the range of the 15-60 cm.

14. The retractable leash assembly of claim 10 further comprising a slide buckle (90) disposed in the second closed loop (88) and movable along the strap element (74) to adjust the size of the second closed loop (88) and thereby adjust a diameter of the safety band (20).

15. The retractable leash assembly of claim 10 wherein the gripping handle attaches to the housing (40) thereby forming an enclosed access loop (48) and the tethering band comprises:
- a strap element (98) having a closed loop (100) formed at a first end thereof for enclosing the loop connector (72);
- a first slide and release buckle (106) disposed to slide along the strap element (98);
- a second closed loop (102) formed at a second end of the strap element (98) for enclosing a second slide and release buckle (104) therein; and,
- wherein the second slide and release buckle (104) is configured to detachably connect with the first slide and release buckle (106) and to thread through the access loop (48).

* * * * *